3,159,451
PREPARATION OF SOLID BORON COMPOUND
Frank C. Gunderloy, Jr., Menlo Park, N.J., assignor to Esso Research and Engineering Company, a corporation of Delaware
No Drawing. Filed Oct. 17, 1960, Ser. No. 63,216
1 Claim. (Cl. 23—14)

This invention relates to a novel method for preparing polymeric hydrazino-bis-borane by the thermal treatment of hydrazine monoborane. The solid polymeric product formed contains the recurring hydrazino-bis-borane unit $N_2H_2(BH_2)_2$. This product has high stability, low sensitivity, and can be made with safety.

The polymeric product obtained through the method of the present invention is useful as a monopropellant, as a polymeric binder, and as a propellant ingredient or component with other propellant fuels and oxidizers, such as used in rocket propellant systems.

A solid polymeric product of somewhat similar composition was prepared by reaction of hydrazine diborane, $N_2H_4 \cdot 2BH_3$, but this reaction is a thermal degradation reaction which is complex involving extreme variations in temperature, and has to be conducted with many precautions over a long period, especially with instability of the starting reactant.

By using the thermal treatment of hydrazine monoborane in accordance with the present invention, there are definite advantages in attaining a better control of heating temperature, and desired properties of the polymeric product.

Hydrazine monoborane is indicated by analysis to have the formula $N_2H_4 \cdot BH_3$. It is given herein the abbreviation HMB. The preparation of HMB that is stable at room temperature and is suitable for making the polymeric material is obtained by reacting a metal borohydride and a hydrazine salt in the presence of a suitable inert diluent, the diluent being preferably a dry cyclic ether, such as tetrahydrofuran (THF). It is also beneficial to use an excess of the hydrazine salt in the reaction which is represented by the following equation:

$$N_2H_4 \cdot HX + NaBH_4 \xrightarrow{THF} N_2H_4 \cdot BH_3 + H_2 + NaX$$

In this reaction THF represents the anhydrous cyclic ether, and the hydrazine salt is represented by $N_2H_4 \cdot HX$, in which HX represents an acid, such as HCl and $CH_3COCH$. The stable HMB product has the appearance of hard, dry crystals. The reaction is carried out preferably at temperatures below the melting point and decomposition temperature of the HMB, and that is preferably at about 0° to 45° C. A high purity HMB is attained by reacting hydrazine hydrochloride (0.22 mol) with 0.2 mol of sodium borohydride stirred together in 250 cc. of the cyclic ether tetrahydrofuran at 0° C. until hydrogen evolution ceases and essentially pure hydrazine monoborane is recovered from the ether solution by evaporation or precipitation with a non-solvent such as pentane, after the ether solution has been filtered to remove solids.

For carrying out the synthesis of the polymeric hydrazino-bis-borane from HMB, the experimental method used is illustrated in the following example:

EXAMPLE

The synthesis was conducted by placing HMB in a flask attached to a −80° C. trap for collecting hydrazine. The system was evacuated by a vented pump to remove continually hydrogen gas. The flask was heated and the HMB melted and formed a froth. The foamed mass resolidified in the flask. The flask was removed and unreacted HMB was extracted with the cyclic ether, THF. The reaction tends to start at 50° C., but best yields are obtained at 80° to 100° C. and thereabove, since a considerable portion of HMB may sublime out of the reaction zone unless it is melted rapidly.

Depending upon the temperature of synthesis, variable amounts of hydrolyzable hydrogen are detectable in the solid product. A representative analysis gave the empirical formula:

$$B_{1.00}N_{1.025}H_{2.99}$$ which approximates $B_2N_2H_6$

This analysis considered with the gas product evolved, gives the overall stoichiometry:

$$2(N_2H_4 \cdot BH_3) \rightarrow B_2N_2H_6 + N_2H_4 + 2H_2$$

The above is a simplified statement of the reaction because the polymeric solid contains the hydrazino-bis-borane unit repeated a number of times, e.g., from about 11 to 55 or more units in the molecule. The hydrazino-bis-borane indicated by the formula $B_2N_2H_6$ may also be written as $N_2H_2(BH_2)_2$. Considering the infrared absorption pattern of the polymeric material which shows a lack of absorption in the 6.8 to 7.3 micron region, which indicates no borazole structures present, and the extreme hydrolytic stability of the polymeric material, the following structural formula is indicated:

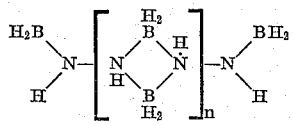

The subscript $n$ in having values from 11 to 55+ to denote the number of hydrazino-bis-borane units, has the lower value at a 60° C. preparation and the higher value of 55+ for a 180° C. synthesis of the polymer. An average density of the polymer product is 1.15 g./cc. This polymeric material is very resistant to hydrolysis and has low impact sensitivity and a high autoignition temperature.

The exceptionally high stability of the hydrazino-bis-borane polymer is attributed to the controllable reaction of the hydrazine monoborane. It appears that the polymer undergoes little change as it is heated to temperatures above 95° C. Refluxing 20% HCl in the presence of the polymer destroyed less than 15% of the polymer sample in 96 hours, and recovered material was spectroscopically unchanged. While the polymer is not as rich in hydrogen as hydrazine diborane, it has a number of other more advantageous properties and qualities such as to make it useful as a good nozzle coolant, that is, when used near the throat of the nozzle in a double grain propellant. The high stability and low sensitivity of the polymer make it quite attractive even though it has a somewhat lower specific impulse than has the hydrazine diborane. The specific impulse is a measure of propellant performance. Offsetting this, the polymer has a higher density than the hydrazine diborane.

A number of significant properties characterizing high purity hydrazino-bis-borane polymers, such as synthesized from stable hydrazine monoborane of high purity are set forth in the following table:

Table
PROPERTIES OF $[N_2H_2(BH_2)_2]_n$ FROM HMB

| | |
|---|---|
| State | White powdery solid. |
| Melting point | Unmelted to 260° C. |
| Density | 1.150±0.005 g./cc. |
| Heat of formation | −49 Kcal./mol. |
| Impact sensitivity | 40 kg.-in. |
| Autoignition temp. | 300 °C. |
| $I_{sp}$ (specific impulse) | 240 sec.$^{-1}$ (calculated as monopropellant). |
| Combustion chamber temp. | 1874° K. (calculated as monopropellant). |

It has been shown that a convenient method for obtaining the hydrazino-bis-borane polymers is through the heat treatment of hydrazine monoborane which is of high stability and quality when formed by reaction of a hydrazine salt with sodium borohydride in the presence of a cyclic ether, such as tetrahydrofuran or tetrahydropyran. These are cyclic saturated ethers which are strongly basic to Lewis acids. On the other hand, using ethyl ether as the reaction medium to form the hydrazine monoborane leads to the formation of moist, flaky particles of the monoborane, which is unstable. Also, the use of the weakly basic straight chain ether medium complicates the reaction of the hydrazine salt with the sodium borohydride. One of the complications is the occurring of caking which inhibits the reaction and the formation of a solid product containing the salt of the borohydride metal, e.g., NaCl which is difficult to separate from the solid.

The present invention is not intended to be limited by the illustrative embodiments but to include all of its inherent novelty under the principles set forth.

What is claimed is:

The process for preparing hydrazino-bis-borane polymer having the empirical formula of substantially $B_2N_2H_6$ which comprises rapidly heating solid hydrazine monoborane, said solid essentially consisting of boron, nitrogen and hydrogen having the composition $$N_2H_4 \cdot BH_3$$

to a decomposition temperature in the range of 50° to 180° C. to melt the hydrazine monoborane solid with a minimum sublimation of the hydrazine monoborane, continuing the heating to decompose the molten hydrazine monoborane with evolution of 2 moles of hydrogen and 1 mole of hydrazine per 2 moles of the hydrazine monoborane decomposed to the hydrazino-bis-borane polymer until the hydrazine monoborane is converted to said polymer, and recovering said polymer substantially free of hydrogen gas, hydrazine, and unreacted hydrazine monoborane.

References Cited in the file of this patent

Emeleus: Chemical Society Journal, 1951, pt. 1, pp. 840–841.

Schechter: Boron Hydrides and Related Compounds, Callery Chemical Co., second edition, May 1954, pp. 13, 44, 49, 69.